Sept. 15, 1970   R. N. LUCHETTA   3,528,557
FILTER CONSTRUCTION
Original Filed Sept. 26, 1968
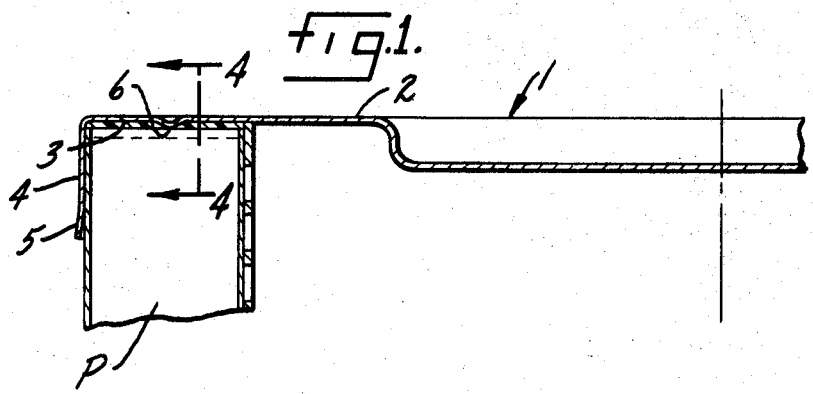
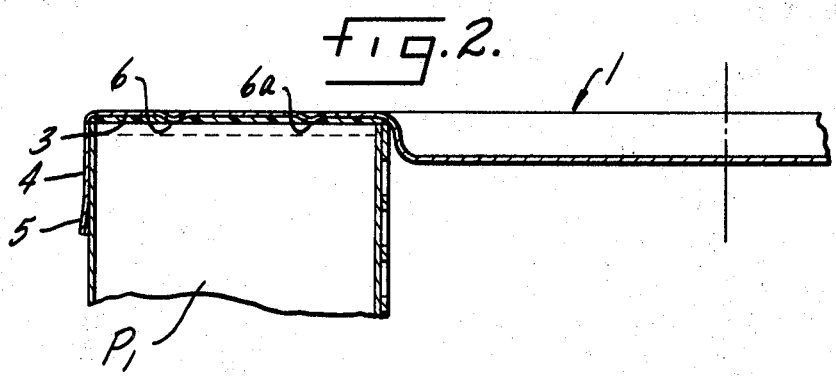
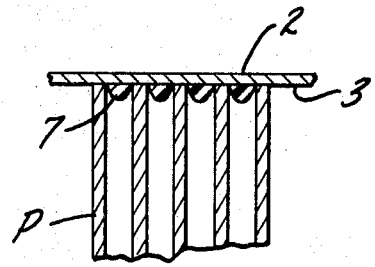
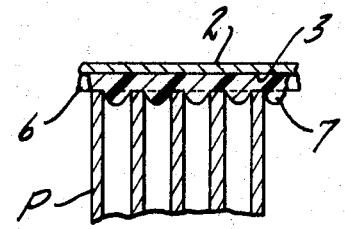
INVENTOR.
Robert N. Luchetta
BY Parker, Carter & Markey
Attorneys.

United States Patent Office 3,528,557
Patented Sept. 15, 1970

3,528,557
FILTER CONSTRUCTION
Robert N. Luchetta, Bensenville, Ill., assignor to Marvel Engineering Company, Chicago, Ill., a corporation of Delaware
Continuation of application Ser. No. 762,727, Sept. 26, 1968. This application Oct. 14, 1969, Ser. No. 866,440
Int. Cl. B01d 27/06
U.S. Cl. 210—493         3 Claims

ABSTRACT OF THE DISCLOSURE

An end cover for a pleated paper filter element, the end cover having a lead-in conformation and a ridge in its base to provide line contact with the end surface of the paper element and preclude the separation of sealant from the cover.

---

This application is a continuation of Ser. No. 762,727, filed Sept. 26, 1968, now abandoned.

SUMMARY OF THE INVENTION

End covers for pleated paper filter elements wherein the end covers have circumferential flanges flared at their outer ends for ease of insertion of the paper filter element and one or more circumferential ridges to provide line contact with the end surfaces of the filter element and to preclude sealant-dispersing contact of the entire end surface of the paper element with the inner planar surface of the end covers and to assure the retention of sufficient sealant to substantially eliminate leaks.

This invention relates to filter elements, and has particular relation to end covers usable with pleated paper, hollow cylindrical fitering members.

One purpose of the invention is to provide an end cover having means facilitating insertion of a paper member.

Another purpose is to provide an end cover having means limiting the interpenetration of the cover and the paper member.

Another purpose is to provide means providing line contact of a filter element end cover with the end surface of a paper filter member.

Another purpose is to provide an end cover for a filter element, the end cover having integral means facilitating retention of sealant against the end cover.

Another purpose is to provide a substantially leakproof assembly comprising a pleated paper filter member and end covers for the opposite ends thereof.

Other purposes will appear from time to time during the course of the specification and claims.

BRIEF DESCRIPTION OF THE DRAWINGS

The invention is illustrated more or less diagrammatically in the accompanying drawings wherein:

FIG. 1 is a cross-sectional view of one form of the invention;

FIG. 2 is a view similar to that of FIG. 1 illustrating a variant form of the invention;

FIG. 3 is a schematic representation of a prior art structure; and

FIG. 4 is a view similar to that of FIG. 3 taken on the line 4—4 of FIG. 1 and illustrating a portion of the invention herein.

DESCRIPTION OF THE PREFERRED EMBODIMENT

Referring now to the drawings, and particularly to FIG. 1, numeral 1 generally designates an end cover. The end cover is generally cup-shaped in cross-sectional configuration and includes an annular filter member receiving section 2 having the inner surface 3. The center portion of cover 1 may be upset as shown in FIG. 1 or it may be upset in the opposite direction, or it may be apertured to provide for passage therethrough of housing outlet sleeves, the reception of bypass valve elements or the like. It will be understood that the invention herein is applicable to filter element end covers having various central or axial configurations and that two such end covers are normally provided, one for each end of the filter element P.

From the outer edge of annular portion 2 the end cover of the invention has an axially paralleling flange or circumferential wall 4. The distal open end of the flange or circumferential wall 4 is outwardly inclined or flared as indicated at 5.

An annular, upstanding ridge 6 is formed on or in the portion 2 of end cover 1 intermediate the inner and outer edges of portion 2 and extending in the direction of and paralleling wall 4.

FIG. 1 shows a single annular ridge 6 upstanding from the inner surface 3 of cover portion 2. Such structure is usable with a paper filter member P of relatively limited radial extension or thickness. As illustrated in FIG. 2, a pair of spaced, parallel, annular ridges 6, 6a may be formed in the inner surface 3 of cover portion 2 when the filter paper member P1 to be associated with the cover 1 is of greater radial extension.

The use and operation of the invention are as follows:

As illustrated in FIG. 3, filter paper members have previously had their opposite ends inserted into end covers having unbroken or flat continuous inner, annular surfaces. The filter paper member end surface was, in such instances, brought into contact with the inner surface of the end cover. The epoxy, plastisol or similar sealant 7 is of thixotropic characteristic in order to permit the filter member, end covers and sealant to be conveyed once through an oven to set the sealant in both covers in one operation. Hence a sealant which might tend to wet the filter paper member, to penetrate the same and to provide a relatively leakproof seal would not be feasible.

Because of the thixotropic nature of the sealant 7, the same is subjected to the meniscus illustrated more or less schematically in FIG. 3. In FIG. 3 the outer loop or curved pleated portions of the paper member, which are normally tightly folded and form virtually a solid end surface, are shown in exaggerated spatial relationship. It will be observed that the end surface of the filter paper member is in direct contact with the flat inner surface of the cover. Filter elements so formed have leaked and investigation has disclosed that the pressing of the end covers on the paper members has been effective to displace the sealant 7, as reflected in FIG. 3, and to produce, particularly within the tight pleats of the paper member, a clean metal cover surface having no sealant therein. The filter paper being porous, it has thus created an area for leakage of air or other fluid.

Reference to FIG. 4 illustrates the result achieved by the invention herein. Ridge 6 limits the interpenetration of the paper member P and the cover 1. Hence a continuous, unbroken layer of the sealing epoxy or plastisol 7 remains across the entire inner surface 3 of the cover portion 2, with the sole exception of the point or line contact between the upper surface of ridge 6 and the end surface of the paper member P. While a similar meniscus occurs, sufficient sealant is present above the ridge 6 to seal the minute point or line contact area of the paper member P and the ridge 6. As shown in the dotted line in FIG. 2, the sealant 7 fills the end cover to a level of the order of twice the height of ridge 6.

While a result similar to that represented in FIG. 4 may be achieved by external means of limiting the interpenetration of the end covers and the paper member P, such means would be cumbersome and expensive in high volume production of filter elements. The provision of ridge 6 is effective to achieve a leakproof relationship between paper member P and the end cover 1 at the relatively infinitesimal cost of forming the ridge 6 in the end cover 1 when the cover is formed. Provision of additional ridge 6a for paper members having greater radial extension precludes any tendency of the paper member P to tilt or slide.

What is claimed is:

1. A filter element including a hollow cylindrical paper member formed of a plurality of radial pleats, metal end covers for said paper member, each of said end covers being generally cup-shaped in cross-sectional configuration and having an annular inner surface opposed to an end surface of said paper members, an annular ridge formed in said inner annular surface of each of said end covers intermediate the inner and outer edges of said annular surface, said ridge being in line contact with the opposed end surface of said paper member, a supply of thixotropic sealant material filling the space between said paper member end surface and said annular surface of said end cover, said sealant material having a meniscus characteristic, said sealant supply being of sufficient quality to fill said end cover to a level above the height of said ridge whereby said sealant material remains in sealing contact with the entirety of said annular inner cover surface and with the end portions of said paper member as a result of the meniscus of said sealant material.

2. The structure of claim 1 wherein said sealant material fills said end cover to a level of the order of twice the height of said ridge.

3. The structure of claim 1 characterized by and including a second ridge paralleling said first ridge and spaced therefrom on said annular inner surface.

References Cited

UNITED STATES PATENTS

| | | | |
|---|---|---|---|
| 2,739,916 | 3/1956 | Parker | 210—493 X |
| 2,871,976 | 2/1959 | Sebok | 55—502 X |
| 2,902,162 | 9/1959 | Humbert et al. | 210—493 X |
| 2,919,765 | 1/1960 | Kasten | 55—498 X |
| 2,943,699 | 7/1960 | Thornburgh | 55—502 X |
| 2,996,145 | 8/1961 | Thornburgh | 55—498 |
| 3,347,026 | 10/1967 | Zankey | 55—510 X |

FOREIGN PATENTS

| | | |
|---|---|---|
| 1,113,686 | 12/1955 | France. |
| 695,998 | 8/1953 | Great Britain. |
| 806,109 | 12/1958 | Great Britain. |
| 808,476 | 2/1959 | Great Britain. |
| 826,325 | 1/1960 | Great Britain. |

REUBEN FRIEDMAN, Primary Examiner

C. M. DITLOW, Assistant Examiner